US006725097B1

(12) United States Patent
Basile et al.

(10) Patent No.: US 6,725,097 B1
(45) Date of Patent: Apr. 20, 2004

(54) METHOD AND DEVICES FOR ASSISTING IN THE CONTROL OF BUILDING OPERATIONS

(75) Inventors: Bernard Basile, Plaisir (FR); Jérôme Stubler, Paris (FR); Jean-Baptiste Domage, Boulogne Billancourt (FR); Eric Laurent, Vanves (FR)

(73) Assignee: Freyssinet International (STUP) (FR)

( * ) Notice: Subject to any disclaimer, the term of this patent is extended or adjusted under 35 U.S.C. 154(b) by 293 days.

(21) Appl. No.: 09/869,626

(22) PCT Filed: Oct. 27, 2000

(86) PCT No.: PCT/FR00/03003
§ 371 (c)(1),
(2), (4) Date: Oct. 15, 2001

(87) PCT Pub. No.: WO01/31468
PCT Pub. Date: May 3, 2001

(30) Foreign Application Priority Data

Oct. 29, 1999 (WO) .............................. PCT/FR99/02664

(51) Int. Cl.$^7$ .............................................. G06F 15/00
(52) U.S. Cl. ........................................... 700/1; 705/10
(58) Field of Search ............................ 700/1; 705/4, 7, 705/10, 11

(56) References Cited

U.S. PATENT DOCUMENTS

| 4,845,643 A | 7/1989 | Clapp |
| 5,864,784 A | 1/1999 | Brayton et al. |

FOREIGN PATENT DOCUMENTS

| EP | 0 650 125 | 4/1995 |
| FR | 2 676 846 | 11/1992 |
| GB | 2 197 513 | 5/1988 |
| JP | 5-61883 | 3/1993 |
| WO | WO 88/05918 | 8/1988 |
| WO | WO 98/10246 | 3/1998 |

OTHER PUBLICATIONS

Ogawa H., et al. "An Expert System for Structure Damage Assessment", Pattern Recognition Letters, Dec. 1984, North–Holland Publication, Amsterdam, vol. 2, No. 6, pp. 427–432.

Battaglia M.F., et al., "Innovative Maintenance Utilizing Videodisc", Proceedings of the International Automatic Testing Conference, (Autotestcon) from 1990: Systems Readings Technology Conference, US, New York, IEEE, vol. Conf. 18, pp. 474–477.

*Primary Examiner*—Emanuel Todd Voeltz
(74) *Attorney, Agent, or Firm*—Cantor Colburn LLP

(57) ABSTRACT

The invention concerns a method for assisting an operator in surveying defects on a building site which consists in providing him with a portable terminal displaying images of the works and inputting data concerning his observations, under the control of a software operating with a database of the works, comprising files defining the images displayed on the terminal graphic interface, data structures relating respectively to types of defects liable to occur in the works, and if any, descriptive data of defects previously observed on the works, organized in accordance with the associated data structures. In response to the selection of a type of fault by the operator, said software activates a dialogue, by means of the associated data structure, to input parameters describing said defects, which are used to constitute a representation of the defect on the image displayed on the graphic interface and to update the data describing the defects.

52 Claims, 9 Drawing Sheets

| CAUSE RECORD N° 09 814 FTC.334 | MATERIAL : steel |

WELDING DEFECT

Définition

The execution of a weld is not always easy and its final quality may vary. There is a welding defect if the quality level reached is not high enough.

Consequences

- weld degradation   09814.FTC.335
- distortion of assembly parts   09814.FTC.336
- element distortion   09814.FTC.337

Observable defects

- defective welded assembly   09814.FTS.343
- crack near a weld bead   09814.FTS.344

Additional investigations

FIG.3a

Detailed information

The weld may be defective for several reasons :

- poor choice of material and in particular incompatibility with the material making up the weld bead and the steel of the welded parts. If the mechanical properties of the materials are too different, there will be cracking and detachment of the weld.
- poor state of the welded parts at the time of welding, in particular poor surface state of the parts with presence of impurities, so that the adhesion of the weld is not effected correctly.
- poor dimensioning of the weld bead, which may be inadequate for the stresses to which the parts are regularly subjected.
- failure to take account of the shrinkage phenomenon. The weld gives off an enormous amount of heat which causes a local rise in the temperature of the parts, at the time when the welding is effected. When the system subsequently cools residual stresses are generated in the parts which may cause cracking.
- defective use of welding : the bead may be irregular or have air bubbles in it.
- lack of penetration, so that the assembly is effected more by bonding of the materials than by fusion.

Reference documents

FIG.3b

| No. | View No. | AXIS | X | Y | TYPE | param. 1 | param. 2 | param. 3 | Photo No. | Comm. |
|---|---|---|---|---|---|---|---|---|---|---|
| 1 | 008 | 0 | 125 | 45 | PROA | M | | | | |
| 2 | 008 | 1 | 25 | 35 | RUIA | 120 | 35 | h | | |
| 3 | 007 | 0 | 175 | 35 | POSA | 500 | s | | | |
| 4 | 007 | 0 | 100 | 70 | POSA | 400 | s | | | |
| ... | ... | ... | ... | ... | ... | ... | ... | ... | | |

METHOD AND DEVICES FOR ASSISTING IN THE CONTROL OF BUILDING OPERATIONS

TECHNICAL FIELD OF THE INVENTION

The present invention relates to the inspection of construction works.

BACKGROUND OF THE INVENTION

The regular and detailed assessment of the state of a construction work makes it possible to establish work diagnostics, to effect monitoring of the maintenance of the work and to use the most appropriate solutions, when repairs become necessary.

Most often, a diagnostics mission involves an exhaustive survey of the visible defects and disturbances on the construction, and on the various materials which make it up. A specialist may then, by analyzing the combined typology and topology of these defects, establish a diagnosis, that is to say identify the cause of these defects, their subsequent consequences, and recommend remedies. In the case of maintenance, in addition to this operation of surveying and analyzing defects, checks and maintenance actions are effected on the structural elements or items of equipment of the work.

The diagnosis also requires a knowledge of the characteristics of the material of the construction work or structural parts, its environment, its conditions of use and operation, for example. More generally, any information useful for the diagnosis must be associated with the construction work. The most frequent association is that of the defects observed on it.

Currently, surveys of defects are effected manually on a set of diagrams. They reproduce the scene observed by the operator, with levels, positions, dimensions, states and comments. They may possibly be supplemented with photographs. At a second stage, these elements are restored on CAD drawings (Computer-Aided Design), to be analyzed, or they are entered manually in tables or database fields. This method of surveying defects depends very much on the conditions of the site, the perception of the operator and the care he takes in transcribing his observations.

The subsequent analysis of the work is an important synthesis task which is tedious and complex, for it requires:
- a topological analysis of the defects, that is to say getting back to the probable causes, through trees of cause-and-effect relationships, statistically (75% of the defects observed are due to this cause etc.),
- a topological analysis of the defects, that is to say a display of a facet of the work, groups of facets in an overall plane, so as to explain geometrically the position of the defects.

SUMMARY OF THE INVENTION

The present invention provides reliable and uniform methods of surveying defects on site. The invention further provides assistance to those responsible for the analysis, to facilitate the recording of the defects and the associated causes, and to automate the production of the analysis reports.

According to the invention, there is provided a method of assisting in the inspection of a construction work, wherein a portable terminal is handed to an operator to perform a collection of information on the work, including a survey of defects, the portable terminal comprising:
- a user interface, including a graphics interface to display views of the work and acquire information relating to observations made by the operator on the work;
- a memory containing a work database, comprising files defining the views of the work displayed on the graphics interface, data structures respectively associated with types of defects which may appear on the work, and description data of any defects previously observed on the work, organized according to the associated data structures; and
- control and processing means allowing the operator to control the display of views of the work from the work database, to control the acquisition of information relating to observed defects, and to update the defect description data.

In response to selection of a type of defect by the operator, the control and processing means activate, by means of the associated data structure, a dialog with the operator for the acquisition of description parameters of the defect, which are used to form a representation of the defect on the view of the work displayed on the graphics interface and to update the defect description data. Identical means may exist for the acquisition of other information useful for diagnostic purposes.

This method suppresses the phase of restoring the observations which the prior methods comprised, and integrates an aid to the on-site survey. By means of the graphics interface displaying views of the visited work, the operator may activate defect description files from the work database, ensuring a rationalized survey made in a single phase.

To acquire the visual description of a defect, the user interface of the portable terminal may have tools for drawing defects on the view of the work displayed on the graphics interface, such as an acquisition and drawing member for a tactile screen.

The views of the work displayed on the graphics interface may be of different kinds. An advantageous representation comprises flat views of facets of the work, in particular unfolded facets.

These views may be supplemented by images (fixed or animated) taken by the operator by means of a camera connectable to an external port of the portable terminal. When the operator takes such an image, after having selected a type of defect, the method associates the updated defect description data with a corresponding image file.

Image processing means may be provided in the portable terminal, to superimpose images taken with the camera on the flat view of one or more facets of the work. The survey of defects is then facilitated. It is sufficient for the operator to acquire the position of the defects by means of the graphics interface tools, then to input the code of these defects and acquire any additional relevant parameters.

Certain of the facets may be associated with data structures representing facet zones displayed on the views of these facets, and for which one or more zone attributes are defined. These facet zones allow a specific survey, which may be different to the general survey on the facet, as well as analyses which are finer than those obtained by the subdivision of the work observed into facets. In particular, it is possible to associate with certain of these facets a defects analysis algorithm, the execution of which involves the examination of conditions relating to features of defects surveyed in the associated facet zones. Such an algorithm makes it possible to diagnose certain defects, or suggest to the operator additional measures or maintenance actions.

The work database may further comprise maintenance data to indicate to the operator maintenance actions to be undertaken on the work.

In a preferred embodiment of the method, the updated defect description data for the work are integrated in an observations database, and analysis software uses the observations database to assist an analysis manager in the preparation of analysis reports further to effected surveys.

The method then provides an analysis tool to assist the diagnosis. The database is analyzed to allow fine topological and typological analyses, the editing of reports (pre-established text files, with variable fields depending on the project).

Typically the observations database and the analysis software are hosted by an analysis computer separate from the portable terminal.

To facilitate the topological analysis of the defects surveyed, this computer may have a display unit, controllable to display at least partially and superimposed, a plurality of distinct facets of the work having a common shape, showing any defects surveyed on these facets. If certain of these facets displayed superimposed have the same shape but different sizes, they may be deformed mathematically, e.g. homothetically, so that they are displayed with a common size or at least the superimposition provides a pertinent representation of the defect configuration. This deformation may be performed automatically or manually by means of a mouse type unit.

The data structures in the work database may include data structures relating to defects appearing in point-like, linear or area form. The analysis software may then display three-dimensional views of portions of the work, including representations of two-dimensional defects obtained from the description parameters of defects appearing in linear form, and/or representations of three-dimensional defects obtained from descriptive parameters of defects appearing in area form.

The observations database may relate to one or more works, and be a portion of another database relating to a greater number of works, means being provided to restrict access to said other database. This allows decentralized use of the method, whilst making it possible to enrich the global database.

To facilitate the typological defect analysis, the analysis software may be arranged to generate, from the updated defect description data, a histogram of the defects observed on at least one part of the work. The analysis manager may select parts of the work which interest him, and include the histograms which appear most significant to him in the analysis report.

The method may also be used to assist the analysis manager in the identification of the causes of the observed defects, even if, of course, the analysis manager is responsible for the actual diagnosis, and in particular the decision to indicate this or that type of cause. For this purpose, each data structure associated with a type of defect is further associated, in the work database, with a set of causes attributable to the observation of this defect.

The analysis software may then be arranged to generate, from updated description data of defects, a histogram of the causes included in the sets associated with the data structures associated with types of defects observed on at least one part of the work.

In practice, after having first defined the data structures associated with the defect types, they may be assembled in a structured way in a general defects database. The data structures of each work database are then extracted from this general database, for example after selection by a filtering performed on the basis of an indication of the type of work.

In an advantageous embodiment of the method, the analysis software uses sort operations effected on the description database of defects observed on the work, a sort operation comprising providing a filtering request from an analysis computer equipped with the analysis software and processing said filtering request by a central server distinct from the analysis computer. Preferably, at least one filtering request received by the central server is processed only if the updated defect description data for the work have been transmitted by the analysis computer to the central server. The analysis computer may then be incited to supply the data it collects, the sort operations being very important in the framework of the analysis tasks. By means of this, it is ensured that the general databases administered by the server are constantly enriched by the data resulting from the on-site observations.

Another aspect of the present invention relates to a portable terminal for assistance in the inspection of a construction work, comprising the elements listed above, and wherein the control and processing means activate, in response to selection of a type of defect by the operator, by means of the associated data structure, a dialog with the operator for the acquisition of description parameters of the defect, use the acquired description parameters, in particular to provide a representation of the defect on the view of the work displayed on the graphics interface, and update the defect description data. The invention is further directed to a computer-readable medium, having software and database modules recorded thereon to be loaded in a portable terminal for carrying out the aforesaid method, as well as said software and database modules considered by themselves.

A third aspect of the present invention relates to an analysis device to assist in the inspection of a construction work, comprising an analysis computer hosting an observations database and analysis software for carrying out a method as set out hereabove from defect description data updated by an operator by means of a portable terminal on the site of the work. The invention is further directed to a computer-readable medium, having software and database modules recorded thereon, including analysis software and an observations database to be loaded in an analysis computer for carrying out the aforesaid method, as well as said software and database modules considered by themselves.

BRIEF DESCRIPTION OF THE DRAWINGS

Other features and advantages of the present invention will appear in the description hereinafter of non-limiting embodiments, with reference to the attached drawings, where:

FIG. 3 formed by placing FIGS. 3a and 3b one on top of the other, shows an example of a cause record which can be used in an embodiment of the invention;

DESCRIPTION OF PREFERRED EMBODIMENTS

Figure 1:
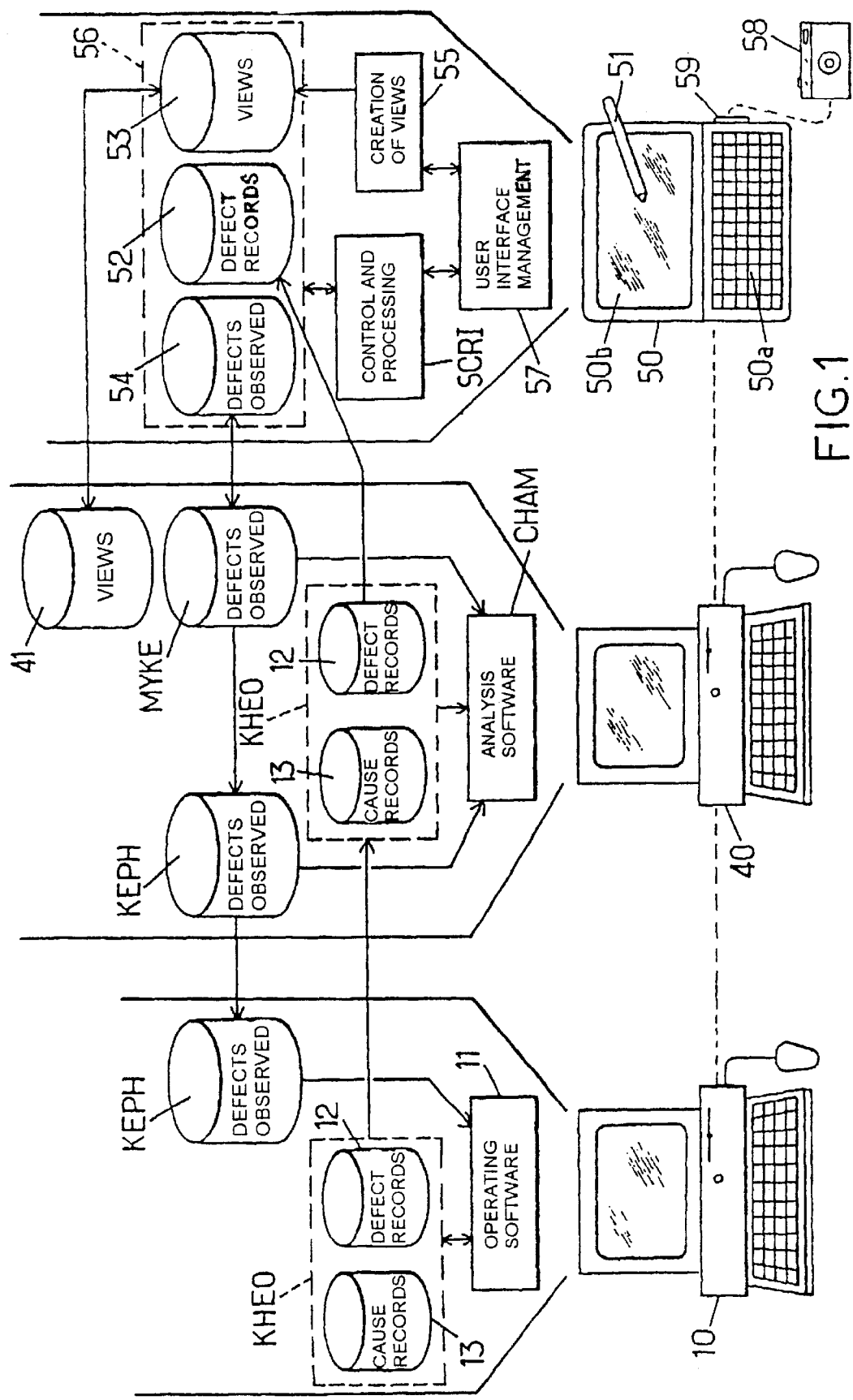
FIG. 1 is a diagram of an example of an exemplary hardware and software architecture adapted for the use of the invention.

In the client-server architecture illustrated by FIG. 1, a central server 10, which may consist of a PC or similar type of office computer, hosts two databases KHEO and KEPH, as well as analysis software 11.

The KHEO database structures the technical knowledge used in the operations of inspecting construction works, effected in accordance with the invention. It comprises in particular two files 12, 13 containing respectively records of defects which may be observed on works, and records of causes attributable to the observation of these defects. The design of these records is made by a supervisor of the system, by means of the analysis software 11. To assist the supervisor in this design, the analysis software 11 has access to the KEPH database, containing information about the defects observed on the inspected works, organized according to the data structures included in the defect records. It is advantageous to bring the maximum of information into this KEPH database hosted by server 10, in order to be able to enrich the KHEO knowledge database.

Figure 2A:
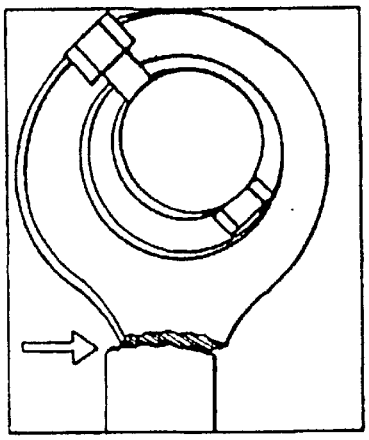
FIG. 2 formed by placing FIGS. 2a and 2b one on top of the other, show an example of a defect record which can be used in an embodiment of the invention.
Figure 2B:
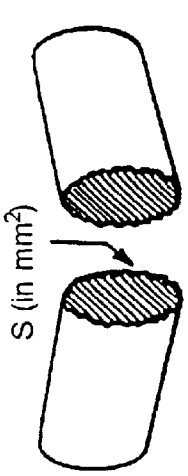

FIG. 2 shows a possible example of the structure of a defect record of the file 12. The record, associated with a type of defect, includes the following fields:

- a field 20 containing a record reference number;
- a field 21 designating the material of the structural elements on which the type of defect may be observed;
- a field 22 giving the name of the defect;
- a field 23 for the definition and identification of the defect, in which the description elements are found in the form of text and/or image, as well as a designation code for the defect, made up of four letters in the example concerned;
- a field 24 for associating the type of defect with a set of one or more possible causes; this field 24 defines indexing links of the defects file 12 with the causes file 13; for each cause indicated, field 24 may specify one or more possible consequences, and/or recommend additional investigations;
- a field 25 describing a measurement method for the defect type, and defining a data structure for the acquisition of the relevant parameters for this defect type; the field 25 includes information as well as a data structure which will be useful to the operators carrying out on-site surveys of defects: sketch explaining the measurements to be taken and defining the parameters measured, suggestions of tools for taking the measurements, associating the measured quantities with numerical or alpha-numerical database fields, possibility of inputting references of an image file, containing a photograph of the defect, possibility of inputting observations in the form of text, etc.;
- a field 26 to designate any reference documents, supplying information or specifications in connection with the defect type.

FIG. 3 shows an example of a defect cause record which may be stored in file 13, including:

- a field 30 containing a record reference number;
- a field 31 designating the material of the construction elements on which the defect cause type may occur;
- a field 32 giving the name of the defect cause;
- a definition field 33, containing explanations in the form of text,
- a field 34 associating the defect cause with one or more consequences, each consequence itself being another defect cause, forming the subject of a record of the same type, the reference number of which is also in the field 34;
- a field 35 associating, in accordance with an indexing relationship which is the opposite of that of the fields 24 of defect records, one or more defects relating to the cause type; the field 35 contains the reference numbers of the defect records in question, and possibly suggests additional investigations;
- a field 36 supplying detailed information concerning the pathology corresponding to the type of defect cause, in the form of text and/or graphics;
- a field 37 identifying where applicable one or more reference documents.

The linking of causes, consequences and observable defects, characterized by the indexing links underlying fields 24, 34 and 35, may be defined by means of flowcharts representing, for each construction material, the cause-to-effect links between the pathologies and the manifestations they may have. The supervisor may define these organization charts by means of the analysis software 11 which transcribes them in the form of indexing links in the KHEO database. Their design may be facilitated by analytical or statistical processing on the data from the real ions, contained in the KEPH database.

In the client-server architecture shown in FIG. 1, the defects and causes files 12, 13 of the KHEO database are copied into the memory of one or more analysis computers 40. These computers 40 may consist of PC or analog type office computers, and be connected to the server 10 temporarily or permanently, by means of a data transmission network. Typically, the analysis computers 40 will be available to companies entrusted with the inspection and diagnosis of a certain number of works.

Each computer 40 is equipped with analysis software referred to as CHAM, which analyzes the KHEO database, as well as the MYKE and KEPH databases, also stored in the computer 40. The KEPH database may be identical to that of the server 10. Alternatively, it may correspond to only the observations made under the control of the company having the computer 40. The MYKE database is a part of the KEPH database, relating to certain construction works only (in practice it is not compulsory for this part to be stored twice in the computer 40).

The analysis computer 40 also stores a graphics file base 41, defining views of the inspected works. For example, these views may be generated by means of the CAD software commercialized under the trademark "Autocad", the use of which is commonplace in drawing construction works.

Figure 4:
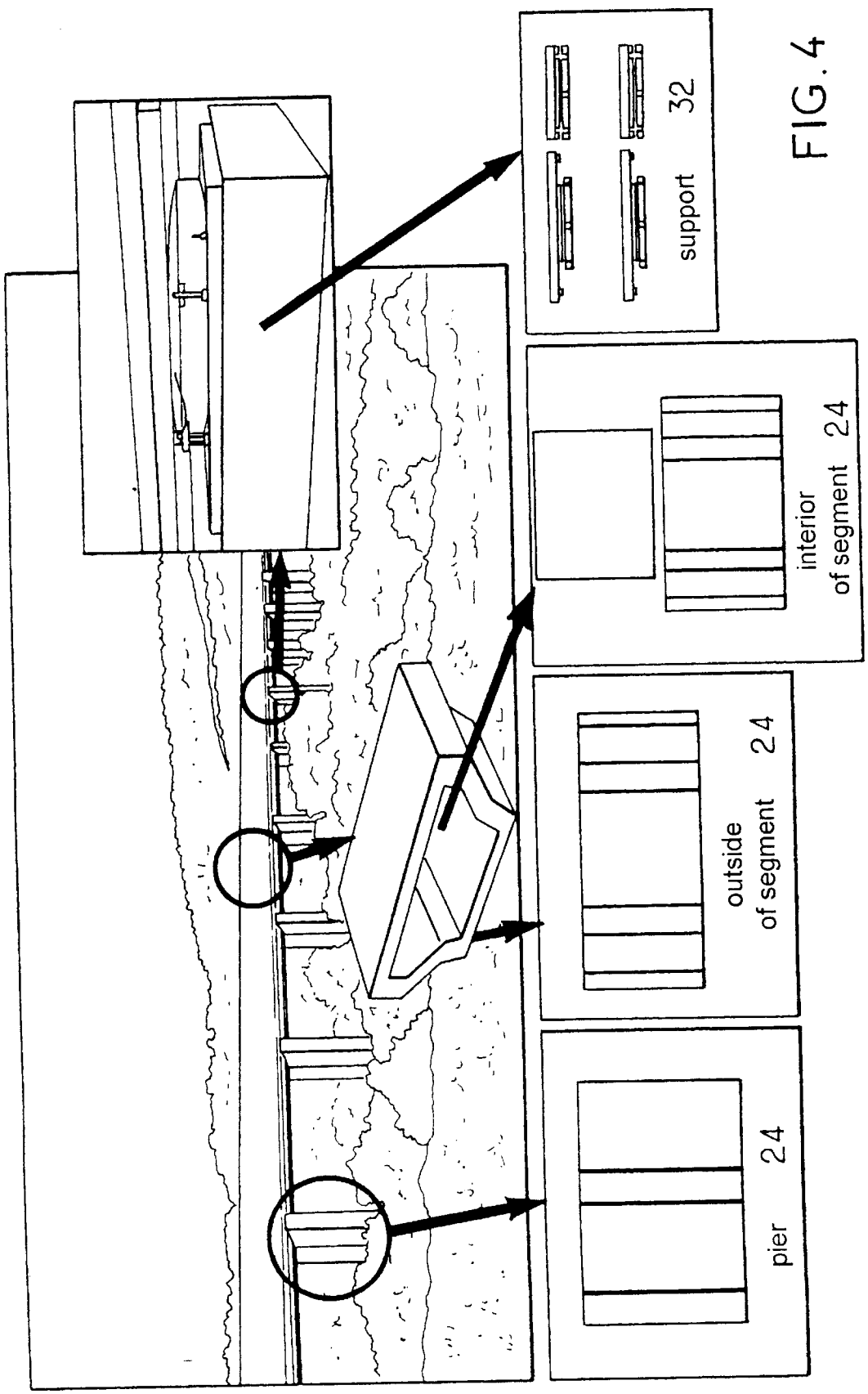
FIG. 4 is a diagram illustrating a way of representing construction elements in an embodiment of the invention.

FIG. 4 illustrates a way of representing the views of a work for an operator, in the particular case where the work is a pier bridge, whose deck is formed of an assembly of successive segments. In this example, each pier is represented by a flat view of its various facets observable from the outside, shown in an unfolded format. On going round a pier, the operator may note observed defects on this flat view of the facets. Likewise, each segment of the bridge may be represented by flat views of facets, distinguishing the facets which may be inspected from the outside and the internal facets which may be inspected by entering into the deck girder. This kind of representation as unfolded facets, makes it possible to display easily various solid portions of the work. Other elements of the work, in particular the equipment attached to the work, may be better shown by views in elevation and/or in perspective. In the example in FIG. 4, this is the case for the support devices 32 situated between the piers and the deck.

On each facet, it is possible to define one or more facet zones, for which specific zone attributes are specified. A zone is delimited by a closed curve such as a polygon or an ellipse superimposed on the facet, making it possible to describe the particular attributes of the zone, and highlight it in relation to the whole. The analysis of the observations in this zone may lead to conclusions different from these same observations on the rest of the facet.

There may be several zones per facet, and these zones may be superimposed or included.

The position of the zone is relative to that of the general coordinate system of the facet. The geometrical characteristics of the zone are its position, its shape and its extent. These are automatically known at the time of its creation by the drawing tool. The creation of a zone therefore consists in drawing a contour on the facet and of putting details into an associated dialog box. The fields to be given information, either compulsorily or optionally, on the occasion of the creation of a facet zone, comprise for example

- a zone name;
- a zone type;
- one or more functions;
- a type of structural operation;
- the type and description of an environment;
- a material;
- a distance value for the definition of a "zone neighborhood";
- a comment;
- one or more photos.

It is then possible to modify or delete this zone. A library of types of zone may also be specified, the names and a part of the attributes of which are predefined, for example "marling zone", "shearing stress zone", etc.

The zone is displayed on the views of the facet by its softened contour or different color, in order not to confuse it with the features and contours of the facet.

Such a zone is useful for determining the importance of a feature in terms of its position in relation to this zone (inside or outside, within the "neighborhood", etc.

The zones are facet parts for which a different or finer analysis is effected. Before that, the fact that an observation is entered on a zone implies different information, for the attention of the inspector. The latter is invited, because he has noted something in this zone, to make an observation or take additional and specific action.

The existence of a zone on a facet may modify the behavior of the "objects" which are placed there. "Object" is taken to mean any observation entered directly on the facet and given a requirement for details by the operator, possibly instructions or recommendations.

Typically this object is a defect, but may also be, for example, a characterization test of the material or of the work. The behavior is dictated by the existence of a table of correspondence between the values which the requirements and instructions must take on, and the zone type. When the object is placed in a facet zone, it takes on the attributes provided for it by the zone through the existence of this table. This makes it possible to adapt the amount and the requirement of information requested from the inspector to the relative importance of the presence of this object in this zone. For such a facet zone, the zone attributes defined in reference to the zone type therefore comprise attributes which affect those of the objects or defects surveyed in this zone.

The facet zones make it possible to constitute "smart" facets which are associated with an automatic analysis algorithm in terms of the data of their (possible) maintenance record, their typology description and the defects surveyed.

The analysis relates to the objects placed on the facet (essentially defects or test results), the values of the parameters of these objects and their position in relation to the zones. As an illustration, if a facet comprises a Zone No. 1 of type "Marling zone" and a Zone No. 2 of the type "Shearing stress zone", an example of an analysis may be: if there is at least one defect of "exposed steel" type in Zone No. 1, with an area of more than 20 $cm^2$, or at least one defect of "exposed steel" type in the neighborhood of Zone No. 1, with an area of more than 40 $cm^2$, then instruct to take a concrete sample having a diameter of 50 mm and a length of 200 mm in Zone No. 1.

The decision may be, as in the example above, an instruction for the inspector.

The decision may also result from a higher analysis element, which does not appear to the inspector, but does appear later to the analyst, as for example in the analysis: if there is at least one crack of orientation between 40° and 50° and with an opening greater than 0.2 mm and a length greater than 1 meter in Zone No. 2, then there is a structural weakness with respect to the shearing stress.

The generation of the facet views and items of equipment for a work such as that in FIG. 4, consisting of elements, many of which are similar, may be repetitive, which speeds up the acquisition. The reference data of the views are advantageously put into a hierarchy, in order to allow a collective call of the similar facet views (for example the views of the piers 15 to 19 or all the external views of segments 18 to 24 in the case of the bridge of FIG. 4).

To define the views of the base 41, the acquisition of the representation parameters may be effected by means of the computer 40, when sufficiently detailed plans of the work are available. Otherwise, it may be effected on the occasion of a visit to the site, as explained further on.

To effect the acquisition of information, including the on-site defect surveys, portable terminals 50 are handed over to the operators. Such a terminal 50 is typically a portable computer, adapted to the on-site conditions: resistant to impacts, dust- and water-proof, provided with a keyboard 50a, a tactile screen 50b and removable memory systems. Advantageously, the user interface of the terminal 50 has a graphics interface, comprising the tactile screen 50b and provided with a pen-type pointing unit 51 for acquisition and manual drawing on the tactile screen 50b.

Before carrying out an on-site survey, the portable terminal 50 is connected to an analysis computer 40, either directly by means of a serial cable, or through a remote data transmission network. After an exchange of identification data, effected in accordance with the applicable authentication procedures, some files are loaded from the computer 40 into the terminal 50:

- a file 52 extracted from file 12 and containing defect records;
- graphics files of views 53 extracted from the base 41;
- files 54 of previously observed defects, extracted from the MYKE base if the work has already been the subject of a defect survey, all the information relating to the visited works and parts of work.

The defect records 52 are selected in file 12 based of indications concerning the type of visited work (pier bridge, suspension bridge, cable-stayed bridge, prestressed concrete building, etc.). This filtering operation, mono- or multi-criteria, makes it possible to select the relevant defects, in order to guide the operator in the surveys to be carried out.

If the views of the work have not been established from drawings, then they are established on the occasion of the first visit to the site. For this purpose, the portable terminal 50 is fitted with views creation software 55 which, in the example previously discussed, may consist of "Autocad" software editing modules. The operator then defines the graphics files corresponding to the observable facets and equipment of the work, and enters the appropriate measurements. Following this first visit, the views thus defined are loaded into the base 41 to be used by the analysis computer 40 and on the occasion of subsequent visits to the site.

If the operator discovers discrepancies between the views which he has loaded from the base 41, and the work portions he observes, he may be authorized to effect modifications of the graphics file, by means of the software 55, specifying his name and the date of the modification.

In the portable terminal 50, control and processing software referred to as SCRI is also installed, which operates with the database formed, in the memory 56 of the terminal, by the data contained in the files 52–54. The 55 and SCRI items of software cooperate with the user interface management software 57 which forms part of the operating system of the terminal 50, in order to allow the user to select and input data by means of the pen 51 and the tactile screen and/or the keyboard.

The acquisition of data, including those relating to defects observed by the operator, is organized according to the data structures defined in the defect records of the file 52 loaded in the terminal.

Figure 5:
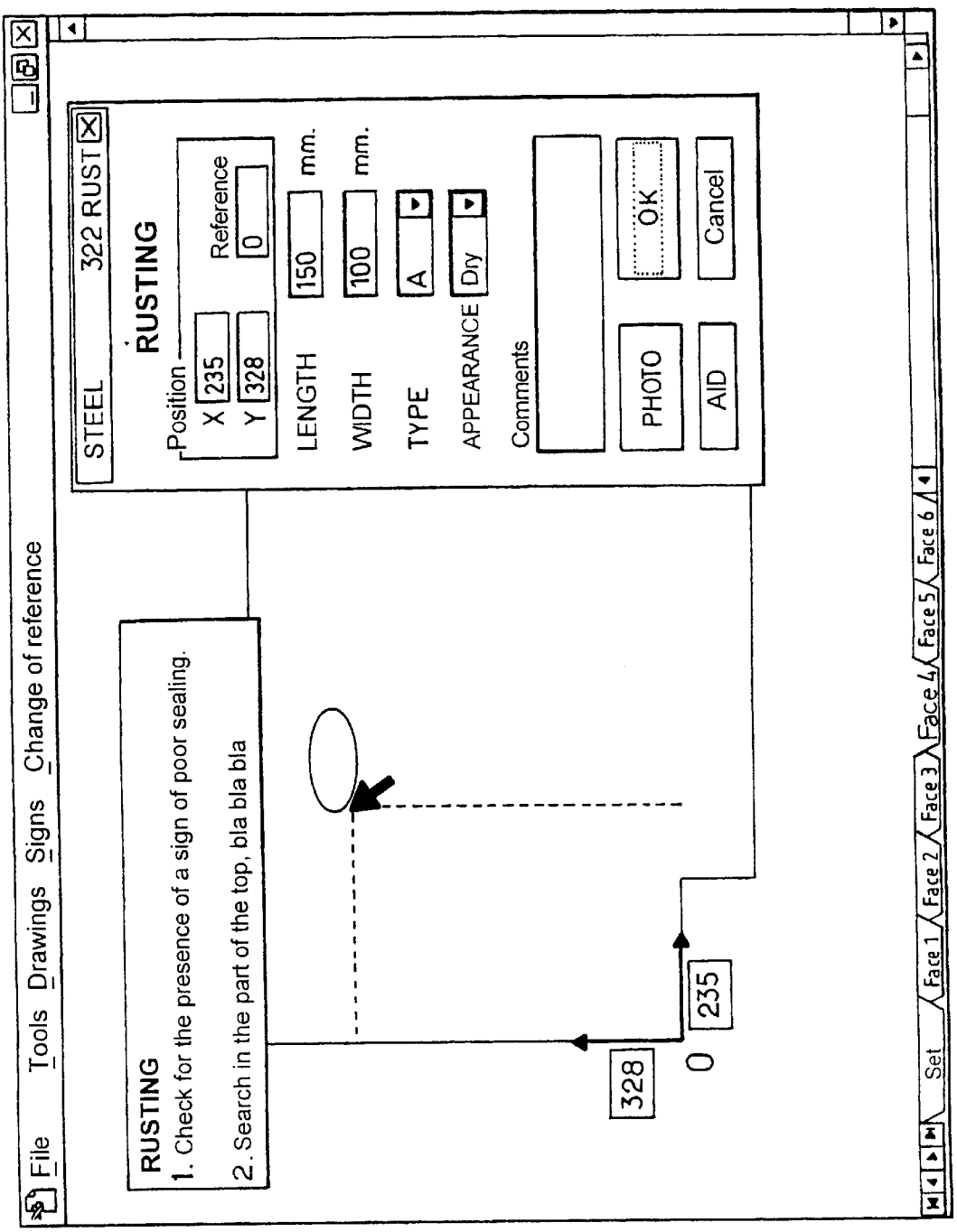
FIG. 5 shows an example of a parameters acquisition window which can be used in an embodiment of the invention.

An illustration of this is given in FIG. 5. After having called from file 53 the work facet being inspected, the view of this facet is displayed on the screen 50b, and the operator may select the record of a defect which he discovers, which causes the display of a dialog window 61, enabling him to input the relevant parameters for the defect in question and form a representation of the defect on the displayed view.

The selection of a defect type is, for example, effected in a system of scrolling menus, icons or bar codes, or else by inputting four-letter codes contained in the definition and identification fields 23 of the defect records. The defects observed on the occasion of previous visits to the work may be represented automatically on the view displayed 60, by calling the corresponding data in the file 54. In this case, the defects may also be selected by pointing to their representation on the displayed view by means of the pen 51, which makes it possible to update the parameters of the defects if necessary.

The operator may draw the defects 62 which he observes on the displayed view 60, using the pen 51 directly, from a standard prerecorded representation, or else by modifying the recorded shape on the occasion of a previous visit. The representation method used depends on the called defect record, and may be defined therein.

The dialog window 61 shows the parameters whose acquisition is compulsory or advised, in accordance with the data structure defined in the fields 25 of selected defect records. Certain parameters, such as the position or dimensions of the defect drawn 62, may be inserted automatically by the SCRI software in the corresponding fields of the window 61 at the time of acquisition.

Geometrically, a defect observed may appear in a point-like form (for example impact on a cable), in a linear form (for example a crack) or an area form (for example a rust stain), which is reflected in the corresponding data structures: method of representation of the defects, relevant parameters to be measured. In all cases, the position (X, Y) of the defect drawn is determined by the SCRI software (the operator may also force this position according to the values he measures if this is more convenient to him). The length A and the width B, also determined by the software on the basis of the drawing, or fixed by the operator, are the dimensions of the rectangle in which the representation of the defect is inscribed. In the case of a defect appearing in linear form, the software also calculates the length L of the defect as observed. In the case of a defect appearing in area form, the software additionally calculates the area $\sigma$ of the defect as observed.

The other main parameters, qualitative or quantitative, may be acquired by the operator by means of the keyboard 50a, or by selecting discrete values from menus.

The operator also has the possibility of inputting comments in determined fields of the dialog window 61, by means of the terminal keyboard. The window 61 may again have a "Photo" button, whose activation allows the operator to associate the data acquired for the defect 62 with an image file generated after the taking of a photograph by means of a digital camera 58 connected to an external port 59 of the terminal 50. The "Photo" button may also be used to control the taking of a photograph through the interface 59. As a variant, the camera 58 may be a digital video camera for the taking of animated images.

Other buttons of the dialog window may be provided in the dialog windows 61, to provide indications to complement the operator's request such as explanations present in the selected defect record.

The images taken by camera 58, which communicates with the terminal through port 59, may further be processed to appear superimposed on the flat views of the facets of the work, displayed on the screen 50b. This provides an ergonomic interface for the operator for the acquisition of the defects: graphics interface tools are used by him to acquire directly the position of the defects, for example by pointing above with the pen 51 in the superimposed displayed image, and opening the dialog windows for the acquisition of the parameters.

The superimposition of a photograph on the parametrized view of the facet may require knowledge:
  of the position and orientation of the camera 58 with respect to the facet when taking the photograph. These parameters are known from the positioning of the camera. If it is installed on a remote controlled vehicle (for example, on board a miniature helicopter), the vehicle may be equipped with inertial and/or telemetry means for automatically determining its position and its attitude and communicating these to the terminal;
  of any optical distortions introduced by the camera 58. These are in general known in advance according to the characteristics of the camera, the distance from the image (deduced from the position of the camera in relation to the facet) and the focal length. If it is not fixed, the focal length is supplied through the interface 59, either from the camera 58 to the terminal 50, or from the terminal to the camera if the latter is controlled from the terminal.

Knowing these parameters, image processing software, with which the terminal 50 is provided, calculates a deformation to be applied to the pixels of the image file in order to be able to superimpose the image on the view of the facet or facets concerned.

To facilitate this calculation, the operator may be invited to indicate on the displayed image specific points of the work (angles, edges, equipment positions, etc.) whose coordinates are known in the coordinate system of the facet. These points are for example four in number for a flat facet, and more for a curved facet. The more numerous they are, the more precise is the superimposition. After having compensated for any optical distortions due to the camera 58, the program effects a spatial interpolation of the image pixels, so as to correctly position the points in question on the unfolded view of the facet. In the case of a flat facet, the interpolation is linear. In the case of a facet having one or more curvatures, an interpolation of higher order is used, for example by means of spline functions or Beziers curves.

If the facet is an unfolded facet, the image processing program performs the above calculations for the various facet portions apparent on the image. In addition, it eliminates the regions of the image which are outside the contour of the facets.

The program may also juxtapose on the same facet several images taken by the camera 58, superimposed on the view of the facet.

Figure 6:
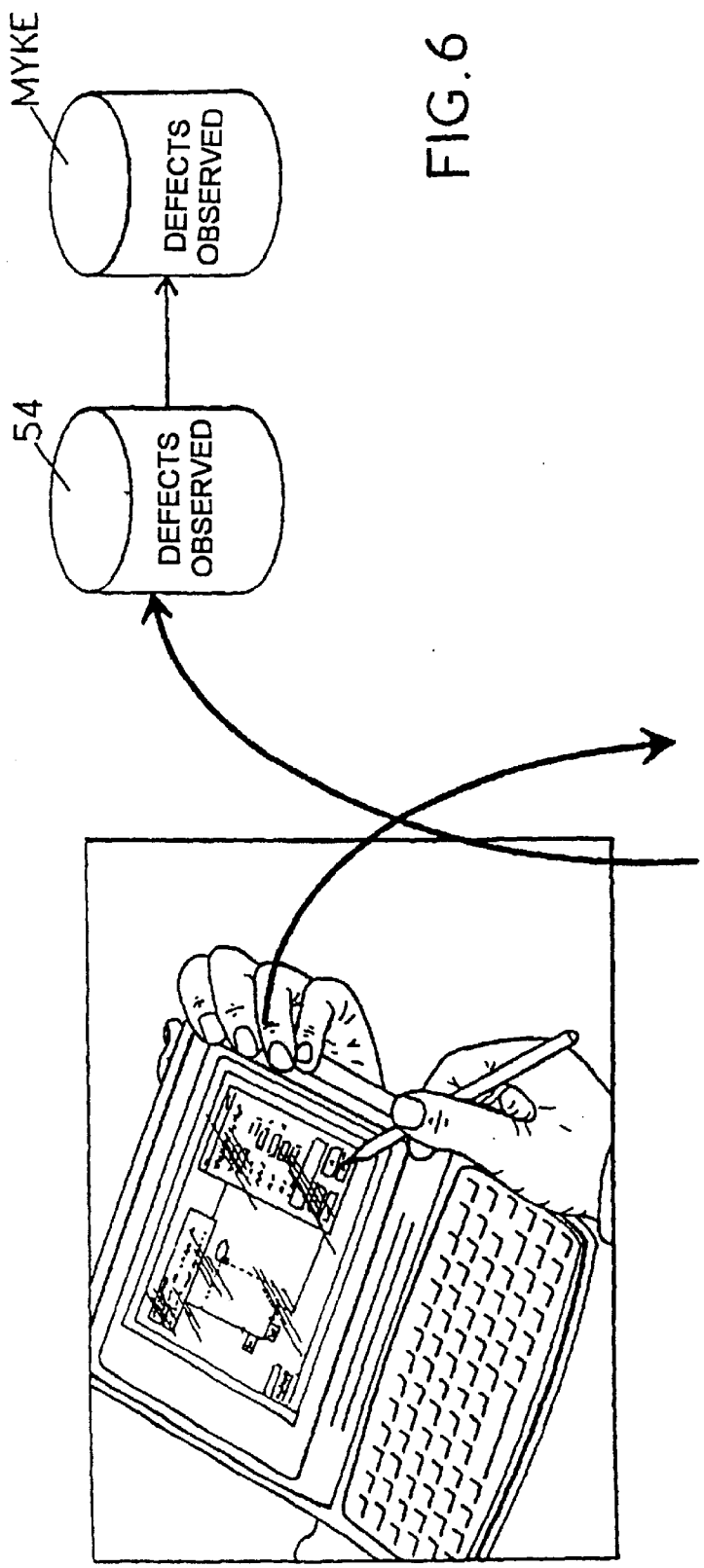
FIG. 6 is a diagram illustrating the translation of the acquired parameters into database records.

From the data acquired then validated by the operator, the SCRI control and processing software generates description data which are recorded in the observed defects file 54. This process is illustrated by FIG. 6. For each defect observation, the record comprises, for example: a record number; a reference of the work view concerned; a coordinate system (the view may be associated with several coordinate system, if it facilitates the measurements), the X, Y position of the defect in this coordinate system; the indication of the type of defect (four-letter designation code); the measured parameters, relevant to the defect in question, as requested by the, defect record; and possibly the comments and references of the image file if the camera 58 was used.

The operator further has the possibility of recording links between the defect surveys effected on different facets of the work, to take into account the fact that the same defect may manifest itself on several facets of the work. The hierarchy of the observed defects database integrates therefore a "group of observed defects" level, relating to the various observations of the same defect.

At the end of the surveying of the information, including that of the defects, effected on the site of the work, the portable terminal 50 is reconnected to the analysis computer 40, to load the descriptive defect data updated in file 54 into the MYKE database. It is from these updated data that the KEPH database in the computer 40 and/or the server 10 is also enriched.

From the description data of the observed defects, updated in the MYKE database, the CHAM analysis software shows the results of the survey to the analysis manager who uses the computer 40. It may also assist the diagnosis in order to identify the causes of the defects and/or make suggestions for intervention on the work.

The analysis computer 40 is equipped with graphics tools facilitating the topological analysis of the defects.

For example, a topological analysis tool of the CHAM software makes it possible to estimate the shape of two-dimensional defects from the observations thereof which have been made in the linear form on facets of the work. For this, it uses standard mathematical extrapolation tools, and it generates three-dimensional views of portions of the work, including two-dimensional representations of these defects, obtained from the updated description parameters in a record or in several linked records from a same group of defects. Likewise, the CHAM software may estimate the shape of three-dimensional defects from observations which have been made in the area form on facets of the work. It may then generate three-dimensional views including 3D representations of these defects, obtained from description parameters updated in one or more records. Such views may be analyzed by the manager and/or inserted in an analysis report published by the manager with the assistance of the CHAM software.

The CHAM software may in addition display on the screen of the computer 40 several facets of the work, having the same shape, in order to analyze the geometrical distribution of the defects on similar elements of the work. In particular, these facets may be represented superimposed, which makes it possible to highlight the concentrations of defect in the equivalent zones of the elements. Certain elements may have the same shape but a different size. In this case, at least one of the distinct facets displayed superimposed is subjected to a mathematical deformation, e.g. homothetic, with respect to the others, so that the representation is made with a single size for all the facets. For example, in the particular case of FIG. 4, the analysis manager may display the superimposed flat views of the facets corresponding to the outside of the successive segments on a certain length of the bridge in order to identify possible structural problems having a certain spatial configuration.

Another useful option may be provided in the CHAM software for defects of the "crack" type observed in several cases on the same facet 70 of the work. Often, this type of configuration of defects is due to a lack of compressive stress in the construction element, for example made of concrete, due to inadequate dimensioning of the work or damage such as the breakage of a pre-stressing cable. To this end, the CHAM analysis software has a module capable of determining a missing stress line, corresponding to a line along which it would be necessary to re-establish a missing compressive stress, on the basis of the description parameters updated for the cracks surveyed on the facet of the work.

Figure 7:
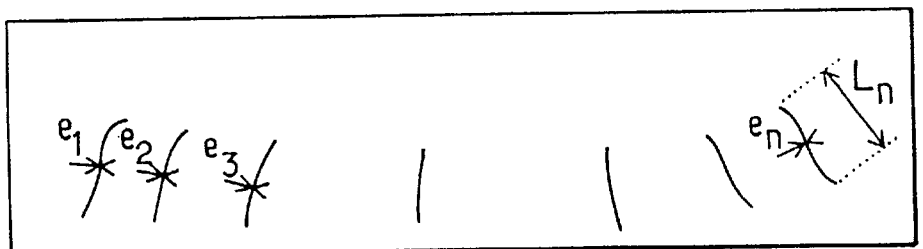
FIGS. 7 to 9 are graphic representations of a facet of a construction work, where multiple cracks are visible, which may be in the framework of a work analysis carried out in accordance with the invention.
Figure 8:
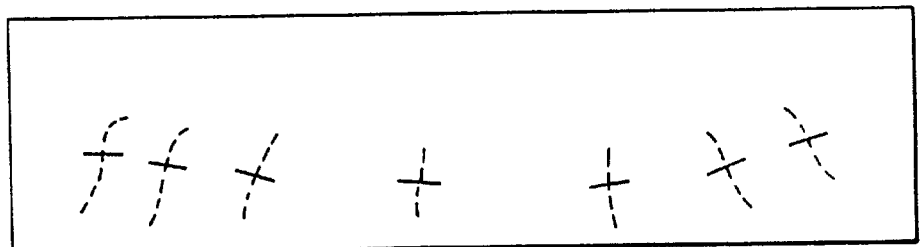
Figure 9:
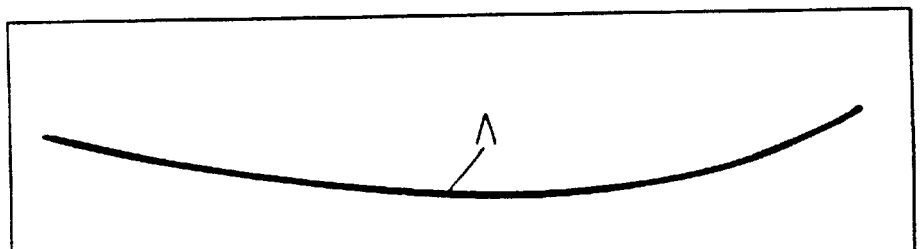

The operation of this module is illustrated by FIGS. 7 to 9. Starting from the parameters observed and stored in the MYKE database, which comprise the direction, the length $L_i$ and the gag width $e_i$ in the case of a crack i, the module determines the straight lines $D_i$ on the facet drawing 70 which are respectively perpendicular to the cracks, intersecting with them at their center (FIG. 8) or at the point of widest gap. For a geometrical interpolation on the basis of the directions of these straight lines at the points where they intersect with their respective cracks, the module obtains the missing stress line $\Lambda$ which may allow the analysis manager to explain the cracks observed. Alternatively, the line $\Lambda$ could be determined simply by interpolation of the positions of the centers of the cracks. The line $\Lambda$ may be represented on the screen of the computer 40 (FIG. 9), with or without the simultaneous representations of the cracks. This representation may be provided with a display of the change of certain parameters along line $\Lambda$, determined by the CHAM software on the basis of the measurements taken. These parameters may comprise the gap width $e_i$, interpolated between the cracks, which gives an idea of the missing compressive stress, or an estimate of this missing stress determined by an empirical formula from this width $e_i$. To display such a parameter, a color variation along the displayed line $\Lambda$, or x-y plots may be used.

Moreover, the analysis manager may study the evolution of a defect over time, by displaying representations corresponding to description data updated for the same defect, on the occasion of successive visits to the site, stored in the MYKE database. The analysis of the evolution of a defect over time may also comprise the production of graphics, illustrating the change in one or more of the parameters defined in the defect record, or of parameters deduced from these by calculations made by the CHAM software. These graphics may be analyzed and/or inserted in the analysis report.

Within the framework of the typological analysis of the defects, the CHAM software also comprises statistical processing tools and multi-criteria sorting tools, allowing the analysis manager to gain rapid access to the information he considers most significant (calculations of averages or of standard deviations for particular parameters, based on a sampling of defects, in particular portions of a work and/or over a given period, comparison with the results obtained on other similar works, etc.).

In particular, the CHAM software may generate histograms from the updated description data in the MYKE database. Such histograms may be displayed on the screen of the computer 40 and/or inserted in the analysis report. These histograms may in particular count or list the defects observed on a given part (defined by a set of view references) or the whole of the work. Such a histogram gives, for each type of defect, the number of observations which have been made thereof on the work. These figures may be weighted by the analysis manager, in terms of the importance he gives to this or that defect.

The fact that the defects are linked to defect causes in the KHEO database makes it possible likewise to establish histograms of causes, corresponding to the defects observed on a part or all of the work. Such a histogram gives, for various defect causes, the numbers of observations of the defects associated with them, possibly modified according to the weightings made by the analysis manager, as well as other information collected on-site, for example the measurement results, a description of the environment, operating conditions.

The CHAM analysis software, in particular by means of its topological and topological analysis tools, provides the analysis manager with assistance allowing him to automate and rationalize the production of the analysis reports. The analysis report may be a word processing file containing diagnostics, comments and suggestions from the analysis manager, in which may be inserted, at the discretion of the manager, objects such as defects or causes histograms, graphics illustrating the evolution over time of certain parameters or results of statistical processing, representations of defects prepared by the CHAM software, reproductions of images taken by the operator, etc. The analysis report may also plan the next visit to the site of the work.

Even if the software is no substitute for the know-how of the analysis manager, it provides him with considerable assistance, in particular by allowing him to increase productivity and avoid possible omissions.

In the organization described above with reference to the architecture illustrated by FIG. 1, three types of intervening parties are involved in the process: the supervisor who gains access to the central server 10, the analysis managers who use the analysis computers 40, and the on-site operators to which the portable terminals 50 are handed. The software with which these computers are equipped also supports procedures authorizing intervention by different people, which define the accesses authorized to the various databases and software. For example, the supervisor may gain access to all of the information, whilst the analysis manager only gains access to the data concerning the works inspected by means of his analysis computer 40, and the supervisor only has the data specifically concerning the works he visits. In this case, the KEPH database stared in the computer 40 is only a part of that stored in the server 10. The latter is supplied by the data obtained via the various analysis computers 40. The on-site operator may gain access to the partial database MYKE and the graphics files 41, relating to the works he visits, as well as the filtered defect records 52 for these works. This access control is effected when the portable terminal 50 is connected to the analysis computer 40.

It will be understood that the organization above is only one example which may be used when implementing the present invention. In particular, the client-server architecture is not compulsory, since all of the tasks described for the computers 10 and 40 may be effected in a single machine.

The operations effected by the analysis computer 40 may also be less than has been described. For example, the sort operations used by the CHAM software in the typological and topological analysis of the defects observed on the work may be effected jointly between the server 10 and the analysis computer 40. A sort operation then comprises the formulation of a filtering request by the CHAM software, defining the relevant sorting criteria. This request is transmitted to the server 10 which processes it and returns the result to the analysis computer 40. The supervisor may exert a certain control over the distribution of copies of substantial parts of the developed software. In addition, to ensure that the new data are regularly passed on to the server 10, in order to enrich its databases, a filtering request received by the central server 10, or at least the first of these requests within the framework of a session, is only processed if the updated defect description data for the work have been previously or simultaneously passed on by the analysis computer to the central server.

In addition, the system may integrate an assistance for maintenance. Certain maintenance actions may be indicated in the defect records, for the cases where certain conditions are observed. In this case, the maintenance actions effected are recorded with the updated observation data. In addition, maintenance or repair actions may be specified in special files organized in a maintenance database, administered by the computer 40, under the control of the analysis manager, in order to indicate to the operator interventions to be carried out on the maintenance missions, together with the defects survey missions or separately. When then terminal 50 is connected to the analysis computer 40, maintenance data may be loaded if necessary and integrated with the work database comprising the files 52–54. These maintenance data are taken into account by the SCRI software, to indicate to the operator the required actions and to prompt him to provide parameters, if necessary.

What is claimed is:

1. A method of assisting in the inspection of a construction work, wherein a portable terminal is handed to an operator to perform a collection of information on the work, including a survey of defects, the portable terminal comprising:

a user interface, including a graphics interface to display views of the work and acquire information relating to observations made by the operator on the work;

a memory containing a work database, comprising files defining the views of the work displayed on the graphics interface, data structures respectively associated with types of defects which may appear on the work, and description data of any defects previously observed on the work, organized according to the associated data structures; and control and processing means allowing the operator to control the display of views of the work from the work database, to control the acquisition of information relating to observed defects, and to update the defect description data, the method comprising the steps of:

activating, in response to selection of a type of defect by the operator, by means of the associated data structure, a dialog between the control and processing means and the operator for the acquisition of description parameters of the defect; and using the acquired defect description parameter to form a representation of the defect on the view of the work displayed on the graphics interface an to update the defect description data.

2. A method in accordance with claim 1, wherein the user interface of the portable terminal has tools for drawing defects on the view of the work displayed on the graphics interface.

3. A method in accordance with claim 2, wherein the tools for drawing defects comprise an acquisition and drawing member for a tactile screen.

4. A method in accordance with claim 1, wherein the views of the work displayed on the graphics interface comprise flat views of facets of the work.

5. A method in accordance with claim 4, wherein said flat views of facets comprise flat views of unfolded facets of the work.

6. A method in accordance with claim 4, wherein at least some of the facets are associated with data structures representing facet zones displayed on the views of said facets, for which one or more zone attributes are defined.

7. A method in accordance with claim 6, wherein at least some of the facets associated with data structures representing facet zones are further associated with a defects analysis algorithm.

8. A method in accordance with claim 7, wherein the execution of the defects analysis algorithm associated with a facet comprises the examination of conditions relating to features of defects surveyed in the associated facet zones.

9. A method in accordance with claim 6, wherein the zone attributes defined for at least one facet zone comprise attributes which affect the description parameters of defects surveyed in said facet zone.

10. A method in accordance with claim 4, wherein the portable terminal is equipped with means of communication with a camera and image processing means to superimpose at least one image taken with said camera on the flat view of at least one facet of the work.

11. A method in accordance with claim 10, wherein the image processing means are associated with means for determining the position and/or orientation of the camera with respect to the work.

12. A method in accordance with claim 10, wherein the image processing means are arranged to apply a geometrical deformation to the image taken with said camera as a function of optical parameters including a focal length used to take the image.

13. A method in accordance with claim 10, wherein the image processing means are arranged to apply a geometrical deformation to the image taken with said camera by an interpolation based on the position, observed on said image, of specific points of the work.

14. A method in accordance with claim 10, wherein the image processing means are arranged to juxtapose several images taken with said camera, superimposed on at least one facet view.

15. A method in accordance with claim 1, wherein the operator is handed a camera connectable to an external port of the portable terminal, and further comprising, when the operator takes an image with said camera after having selected a type of defect, the step of associating the updated defect description data with a corresponding image file.

16. A method in accordance with claim 1, wherein the data structures in the work database include data structures relating to defects appearing in point-like form, data structures relating to defects appearing in linear form, and data structures relating to defects appearing in area form.

17. A method in accordance with claim 1, wherein the work database has maintenance data to indicate to the operator maintenance actions to be undertaken on the work.

18. A method in accordance with claim 1, further comprising the steps of:

integrating the updated defect description data for the work into an observations database; and using the observations database in analysis software to assist an analysis manager in the preparation of analysis reports further to effected surveys.

19. A method in accordance with claim 18, wherein the observations database and the analysis software are hosted by a computer separate from the portable terminal.

20. A method in accordance with claim 19, wherein said computer has a display unit, controllable to display at least partially and superimposed, a plurality of distinct facets of the work having a common shape, showing any defects surveyed on said facets.

21. A method in accordance with claim 20, wherein at least one of the distinct facets displayed superimposed is deformed mathematically with respect to others of said facets having the common shape, but a different size.

22. A method in accordance with claim 18, wherein the data structures in the work database include data structures relating to defects appearing in linear form, and the analysis software is arranged to display three-dimensional views of portions of the work, including representations of two-dimensional defects obtained from description parameters of defects appearing in linear form.

23. A method in accordance with claim 18, wherein the data structures in the work database include data structures relating to defects appearing in area form, and the analysis software is arranged to display three-dimensional views of portions of the work including representations of three-dimensional defects obtained from description parameters of defects appearing in area form.

24. A method in accordance with claim 18, wherein the analysis software is arranged to determine a missing stress line on the basis of description parameters of defects corresponding to a plurality of cracks surveyed on a facet of the work.

25. A method in accordance with claim 24, wherein the analysis software is arranged to generate a representation of the missing stress line on a view of said facet of the work.

26. A method in accordance with claim 24, wherein the defect description parameters comprise a crack width for any "crack" type defect surveyed on said facet of the work, and wherein the analysis software is arranged to determine a change in a function of the crack width along the missing stress line.

27. A method in accordance with claim 18, wherein the observations database relates to one or more works, and is a portion of another database relating to a greater number of works, means being provided to restrict access to said other database.

28. A method in accordance with claim 18, wherein the analysis software is arranged to generate, from updated defect description data, a histogram of the defects observed on at least one part of the work.

29. A method in accordance with claim 18, wherein each data structure associated with a type of defect is further associated with a set of causes attributable to the observation of said defect.

30. A method in accordance with claim 29, wherein the data structures in the work database and the sets of associated causes are extracted from a general defects database.

31. A method in accordance with claim 30, wherein the data structures and the sets of associated causes are selected from the general defects database by a filtering performed on the basis of at least work type indications.

32. A method in accordance with claim 29, wherein the analysis software is arranged to generate, from updated defect description data, a histogram of the causes included in the sets associated with the data structures associated with types of defects observed on east one part of the work.

33. A method in accordance with claim 18, wherein the analysis software uses sort operations effected on the description database of defects observed on the work, a sort operation comprising providing a filtering request from an analysis computer equipped with the analysis software and processing said filtering request by a central server distinct from the analysis computer.

34. A method in accordance with claim 33, wherein at least one filtering request received by the central server is processed only if the updated defect description data for the work have been transmitted by the analysis computer to the central server.

35. A method in accordance with claim 1, wherein the information collected on the work, acquired and recorded by means of the graphics interface, includes features relating to the material of the work or work parts, to the environment of the work or its conditions of use and operation.

36. A portable terminal for assistance in the inspection of a construction work, comprising:
a user interface, including a graphics interface to display views of the work and acquire information relating to observations made by an operator on the work;
a memory containing a work database, comprising files defining the views of the work displayed on the graphics interface, data structures respectively associated with types of defects which may appear on the work, and description data of any defects previously observed on the work, organized according to the associated data structures; and
control and processing means allowing the operator to control the display of views of the work from the work database, to control the acquisition of information relating to observed defects, and to update the defect description data,
wherein the control and processing means are arranged to activate, in response to selection of a type of defect by the operator, by means of the associated data structure, a dialog with the operator for the acquisition of description parameters of the defect, to use the acquired description parameters to provide a representation of the defect on the view of the work displayed on the graphics interface, and to update the defect description data.

37. A portable terminal in accordance with claim, 36, wherein the user interface has tools for drawing defects on the view of the work displayed on the graphics interface.

38. A portable terminal in accordance with claim 37, wherein the tools for drawing defects comprise an acquisition and drawing member for a tactile screen.

39. A portable terminal in accordance with claim 36, wherein the views of the work displayed on the graphics interface comprise flat views of facets of the work.

40. A portable terminal in accordance with claim 39, wherein at least some of the facets are associated with data structures representing facet zones displayed on the views of said facets, for which one or more zone attributes are defined.

41. A portable terminal in accordance with claim 40, wherein at least some of the facets associated with data structures representing facet zones are further associated with an algorithm for analyzing defects in relation to features of defects surveyed in said facet zones.

42. A portable terminal in accordance with claim 40, wherein the zone attributes defined for at least one facet zone comprise attributes which affect the description parameters of defects surveyed in said facet zone.

43. A portable terminal in accordance with claim 39, further comprising means of communication with a camera and image processing means to superimpose at least one image taken with said camera on the flat view of at least one facet of the work.

44. A portable terminal in accordance with claim 43, wherein the image processing means are associated with means for determining the position and/or orientation of the camera with respect to the work.

45. A portable terminal in accordance with claim 43, wherein the image processing means are arranged to apply a geometrical deformation to the image taken with said camera as a function of optical parameters including a focal length used to take the image.

46. A portable terminal in accordance with claim 43, wherein the image processing means are arranged to apply a geometrical deformation to the image taken with said camera by an interpolation based on the position, observed on said image, of specific points of the work.

47. A portable terminal in accordance with claim 36, comprising an external port for connecting a camera, the control processing means being arranged to associate the updated defect description data with an image file corresponding to an image taken with said camera.

48. A computer-readable medium, having control and processing software and at least one work database recorded thereon to be loaded in a portable terminal for assistance in the inspection of a construction work, said portable terminal comprising a user interface, including a graphics interface to display views of the work and acquire information relating to observations made by an operator on the work, and a memory for containing said work database, wherein said work database comprises files defining the views of the work displayed on the graphics interface, data structures respectively associated with types of defects which may appear on the work, and description data of any defects previously observed on the work, organized according to the associated data structures, wherein said control and processing software is adapted to allow the operator to control the display of views of the work from the work database, to control the acquisition of information relating to observed defects, and to update the defect description data, and wherein the control and processing software is arranged to activate, in response to selection of a type of defect by the operator, by means of the associated data structure, a dialog with the operator for the acquisition of description parameters of the defect, to use the acquired description parameters to provide a representation of the defect on the view of the work displayed on the graphics interface, and to update the defect description data.

49. Software and database product, comprising control and processing software and at least one work database to be loaded in a portable terminal for assistance in the inspection of a construction work, said portable terminal comprising a user interface, including a graphics interface to display views of the work and acquire information relating to observations made by an operator on the work, and a memory for containing said work database, wherein said work database comprises files defining the views of the work displayed on the graphics interface, data structures respectively associated with types of defects which may appear on the work, and description data of any defects previously observed on the work, organized according to the associated data structures, wherein said control and processing software is adapted to allow the operator to control the display of views of the work from the work database, to control the acquisition of information relating to observed defects, and to update the defect description data, and wherein the control and processing software is arranged to activate, in response to selection of a type of defect by the operator, by means of the associated data structure, a dialog with the operator for the acquisition of description parameters of the defect, to use the acquired description parameters to provide a representation of the defect on the view of the work displayed on the graphics interface, and to update the defect description data.

50. An analysis device to assist in the inspection of at least one construction work, comprising an analysis computer hosting an observations database and analysis software, wherein the observations database integrates updated defect description data obtained for at least one work by means of a portable terminal handed to an operator, said portable terminal comprising:

a user interface, including a graphics interface to display views of the work and acquire information relating to observations made by the operator on the work;

a memory containing a work database, comprising files defining the views of the work displayed on the graphics interface, data structures respectively associated with types of defects which may appear on the work, and description data of and defects previously observed on the work, organized according to the associated data structures; and control and processing means allowing the operator to control the display of views of the work from the work database, to control the acquisition of information relating to observed defects, and to update the defect description data, wherein the control and processing means are arranged to activate, in response to selection of a type of defect by the operator, by means of the associated data structure, a dialog with the operator for the acquisition of description parameters of the defect, to use the acquired description parameters to provide a representation of the defect on the view of the work displayed on the graphics interface, and to update the defect description data, and wherein the analysis software is arranged to use the observations database to assist an analysis manager in the preparation of analysis reports further to effected surveys.

51. A computer-readable medium, having software and database modules recorded thereon, including analysis software and an observations database to be loaded in an analysis computer,
wherein the observations database integrates updated defect description data obtained for at least one construction work by means of a portable terminal handed to an operator, said portable terminal comprising:

a user interface, including a graphics interface to display views of the work and acquire information relating to observations made by the operator on the work;

a memory containing a work database, comprising files defining the views of the work displayed on the graphics interface, data structures respectively associated with types of defects which may appear on the work, and description data of any defects previously observed on the work, organized according to the associated data structures; and control and processing means allowing the operator to control the display of views of the work from the work database, to control the acquisition of information relating to observed defects, and to update the defect description data, wherein the control and processing means are arranged to activate, in response to selection of a type of defect by the operator, by means of the associated data structure, a dialog with the operator for the acquisition of description parameters of the defect, to use the acquired description parameters to provide a representation of the defect on the view of the work displayed on the graphics interface, and to update the defect description data, and wherein the analysis software is arranged to use the observations database to assist an analysis manager in the preparation of analysis reports further to effected surveys.

52. Software and database product, including analysis software and an observations database to be loaded in an analysis computer,
wherein the observations database integrates updated defect description data obtained for at least one construction work by means of a portable terminal handed to an operator, said portable terminal comprising:

a user interface, including a graphics interface to display views of the work and acquire information relating to observations made by the operator on the work;

a memory containing a work database, comprising files defining the views of the work displayed on the graphics interface, data structures respectively associated with types of defects which may appear on the work, and description data of any defects previously observed on the work, organized according to the associated data structures; and control and processing means allowing the operator to control the display of views of the work from the work database, to control the acquisition of information relating to observed defects, and to update the defect description data, wherein the control and processing means are arranged to activate, in response to selection of a type of defect by the operator, by means of the associated data structure, a dialog with the operator for the acquisition of description parameters of the defect, to use the acquired description parameters to provide a representation of the defect on the view of the work displayed on the graphics interface, and to update the defect description data, and wherein the analysis software is arranged to use the observations database to assist an analysis manager in the preparation of analysis reports further to effected surveys.

* * * * *